Jan. 8, 1935.  R. E. HANSON  1,986,928
POULTRY SANITARY DRINKING FOUNTAIN
Filed June 9, 1932
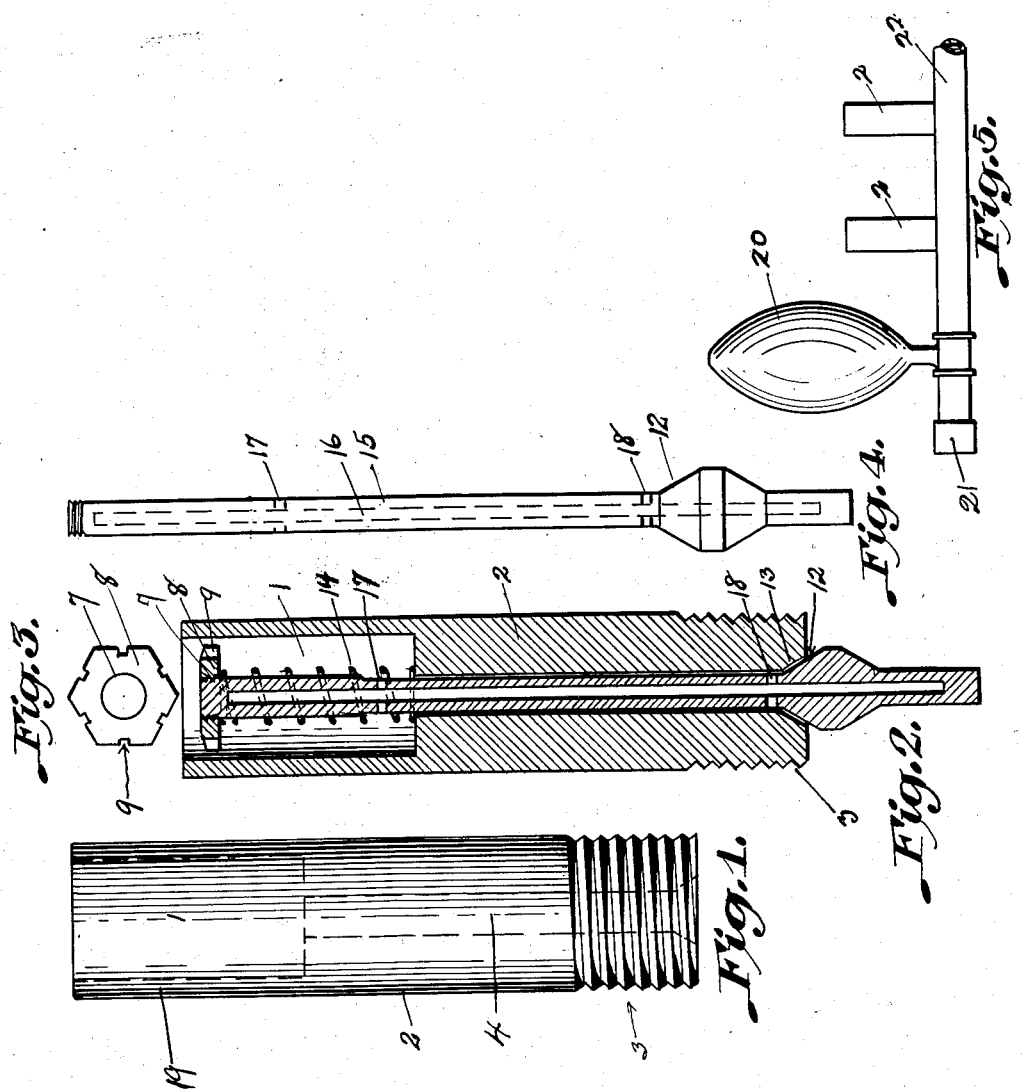
Inventor:
Robert E. Hanson Patented Jan. 8, 1935

1,986,928

UNITED STATES PATENT OFFICE 1,986,928

POULTRY SANITARY DRINKING FOUNTAIN

Robert E. Hanson, San Jose, Calif.

Application June 9, 1932, Serial No. 616,294

1 Claim. (Cl. 119—74)

The object of my invention is to provide a suitable device whereby poultry of all kinds can obtain a plentiful supply of pure water, uncontaminated by disease germs or other filth from themselves, other fowls, or from their surroundings, and making it impossible for them to have access to any contaminated water. Another object is to provide a device which will eliminate the necessity of cleaning water pans and troughs.

In the drawing:

Figure 1 is a side elevation of the fountain in its simplest form,

Fig. 2 is a vertical section of the fountain,

Fig. 3 is a top view of the valve stem nut,

Fig. 4 is a side view of the valve stem,

Fig. 5 is a side elevation of the system showing two fountains.

The stand pipe 2, conveniently about an inch and a half in length, has threads 3 as a means of fastening into the pipe 22. The top of the pipe 2 may either be round, as shown in Fig. 1, or enlarged and hexagonal.

The inside diameter of pipe 2 is conveniently about one-eighth of an inch, widened at the top into a cup of about three times the diameter. The lower orifice of the pipe 2 is ground into a valve seat 13. A valve stem 15, consisting of a round rod having several longitudinal grooves, is provided with threads 7 at the top to receive a nut 8, said nut being thin and provided with a notched periphery 9. The valve 12 fits into seat 13 and is provided near the bottom with an expanded portion which may be in the form as shown in Fig. 2.

The coiled spring 14 serves to close the valve in the absence of a float chamber. Connected with supply pipe 22 is an air chamber 20. The passage 16 is provided with openings 17 and 18, one near each end of stem 15 whose ends are closed.

The supply pipe 22 brings water to a series of fountains 2, 2. The end of the pipe is closed by a cap 21, and near this cap is an air chamber 20. In case the pipe 22 is small, varying pressure in the system might interfere with the proper working of the valves. The compressed air in chamber 20 serves temporarily to prevent a drop in pressure.

The fountain is operated as follows: A fowl finds water in cylindrical cup 1, and inserts his bill. Doing so presses down the flat nut 8 together with the stem 15 and the expansion, or valve 12. Water then runs up the groove 16 in the stem and supplies the bird until it withdraws its bill. As soon as the bill is lifted, the valve is closed by the rush of water upward through the longitudinal passages in the stem, which may be either along the tube inside the stem, or through the grooves about the stem. The rush of water against the nut 8 also tends to lift the valve. Spring 14 also assists in closing the valve, until no more water comes up the tube 4.

Beneath the pipe 22 should run a trough (not shown) to carry away waste water, for the fountain cups should be regulated to overflow each time used to keep them flushed clean. As water is being used for domestic purposes the pressure in the system will vary a great deal, but my system provides for regulation under all circumstances.

I claim:

A sanitary drinking fountain for poultry having in combination a tube to convey water, with a valve seat at its lower end, and threaded at its lower end to screw into a water supply pipe, said tube having an enlarged chamber at the upper end to reduce the velocity of the water stream, with the walls of the enlarged chamber approximately parallel to cause a fountain-like projection of water upward a short distance above the upper end of said tube, a stem within said tube with an enlargement adjacent the lower end capable of closing the bottom of said tube when projected upward by the pressure of the water, and a flat nut at the upper end of said stem with openings in said nut to allow water to pass upward above the end of said tube, said stem having longitudinal passages from the lower enlargement or valve to the flat nut at the upper end to allow water to pass when the valve is opened by pressure of a fowl's beak on said nut.

ROBERT E. HANSON.